Nov. 29, 1955        B. STRONG        2,724,860
METHOD OF AND MACHINE FOR BLOWING HOLLOW ARTICLES
Filed Sept. 10, 1951        2 Sheets-Sheet 1
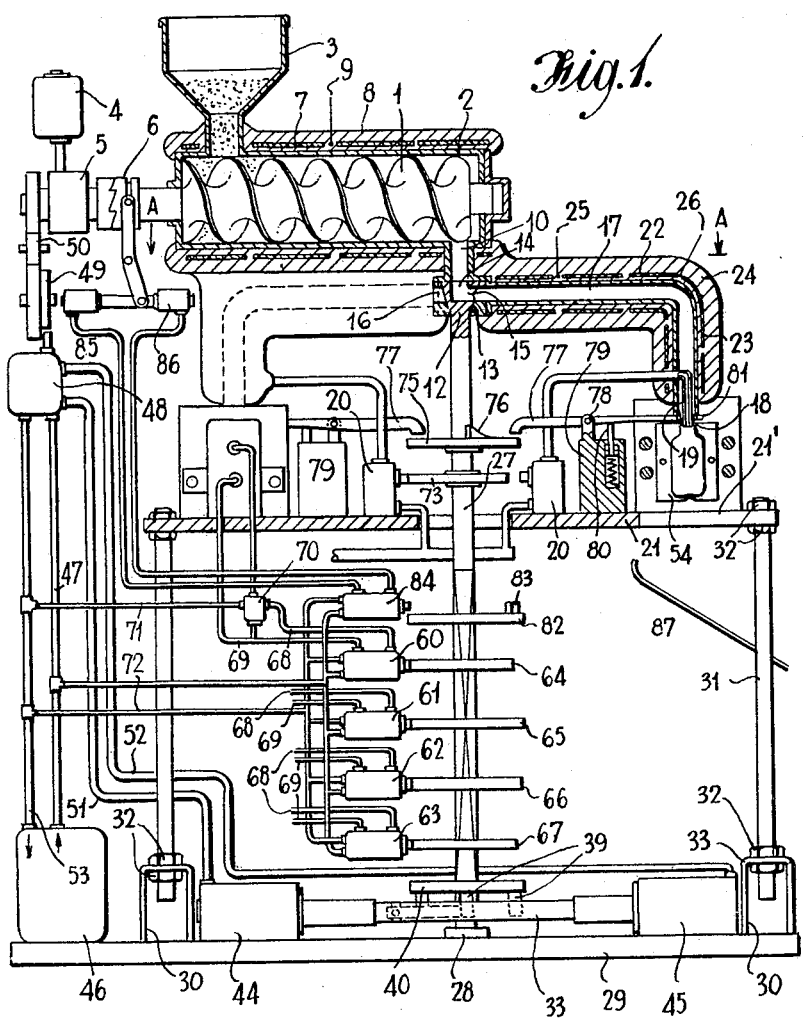
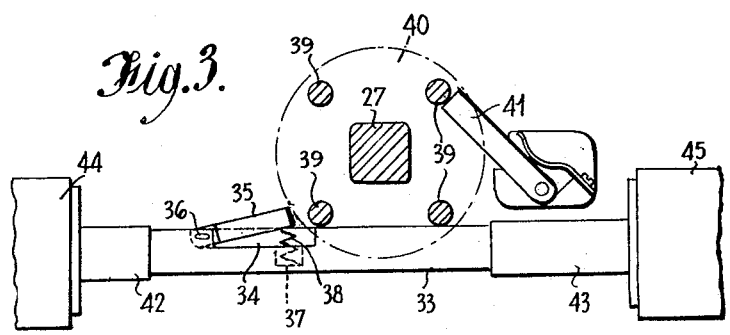
Inventor
BERNARD STRONG
By Emery, Holcombe & Blair
Attorney

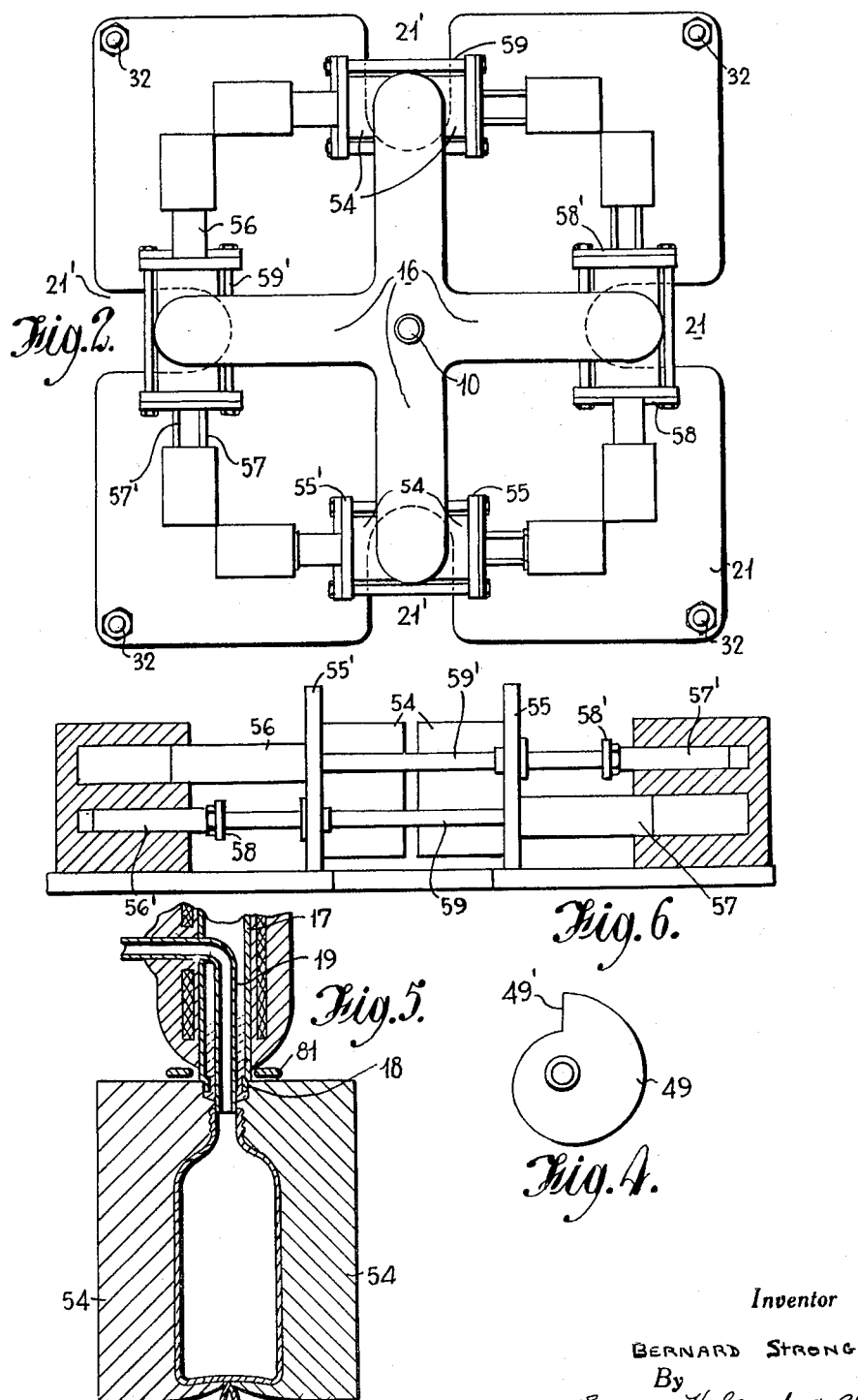

United States Patent Office 2,724,860
Patented Nov. 29, 1955

2,724,860

METHOD OF AND MACHINE FOR BLOWING HOLLOW ARTICLES

Bernard Strong, Ferndown, Northwood Hills, England, assignor to E. Shipton & Company Limited, Ferndown, Northwood Hills, England, a British company Application September 10, 1951, Serial No. 245,928

Claims priority, application Great Britain September 11, 1950

20 Claims. (Cl. 18—5)

It is already known to blow bottles and other hollow articles from organic plastic materials, commonly known as "plastics," by extruding the material in plastic form through an annular extrusion nozzle to form a tube of the plastic material, and, after the end of the tube has been closed, to blow the tube to conform with the contour of a surrounding mould cavity. Such a method is employed for the manufacture of bottles from the thermoplastic material known as polythene.

The present invention has for an object to provide an improved machine for the manufacture of such blown bottles and other hollow articles which enables their rate of production to be increased. A further object is to provide a process and machine for the manufacture of such blown hollow articles which permits the extrusion feed screw to be rotated continuously so long as the machine is in operation. Another object is to provide a machine comprising a number of moulds in which the hollow articles are successively made, said moulds remaining in their set locations, thereby avoiding any rotatable frame or table for feeding the moulds to a moulding position. A still further object of the invention is to provide a machine for the manufacture of such hollow articles which is entirely or substantially entirely automatic in operation.

The present invention consists in an extrusion machine adapted to feed a plurality of extrusion nozzles, in combination with means for shutting off one of said nozzles from the supply of plastic material and substantially simultaneously connecting another nozzle to the supply of plastic material. In this way, one bottle may be in the process of being blown and cooled within a mould while simultaneously tubing is being extruded from the other or another nozzle. Upon the desired length of tubing being extruded from the second nozzle, the change-over means is again operated to shut off the supply of plastic to the second nozzle and either to re-connect it to the first nozzle or to connect it to a third nozzle. In the first case the material extruded from the first nozzle has to be blown and the mould opened and the bottle removed from the nozzle during the time required for extruding the tube from the second nozzle, if the extrusion feed screw is to be continuously rotated. If this time is insufficient, and it is not desired to stop the extrusion feed, then the second alternative should be adopted, namely to extrude the material from a third nozzle upon shutting off the second nozzle. Sufficient nozzles are provided to provide the desired time cycle for blowing, cooling and removing a bottle from one nozzle before the change-over means has completed its cycle and is again in the position to extrude plastic material from that nozzle. Thus it becomes possible continuously to rotate the extrusion feed screw with consequent maximum output from the machine. This is not possible with single nozzle machines, nor with multiple-mould machines which are moved successively on a rotatable table into relationship with a single extrusion nozzle.

The invention also consists in a machine for the manufacture of blown hollow articles from organic plastic material comprising a chamber containing a rotatable feed screw, means for feeding comminuted solid organic plastic material to said chamber, said screw advancing the material fed thereto towards an outlet opening, means for heating said chamber so that the material is plasticised to a semi-fluid mass before it reaches said outlet opening, conduits leading from said opening to a plurality of extrusion nozzles, each comprising inner and outer tubular members defining between them an annular passage through which the semi-fluid mass fed thereto will be extruded in tubular form, heating means associated with said conduits for maintaining any plastic material therein in the semi-fluid state, shut off means for permitting or stopping the extrusion of plastic material through each of said nozzles, change-over means for selectively operating said shut off means for extruding the plastic material from said nozzles in turn, means for feeding a compressed fluid through the inner member of each nozzle, and valve means for controlling the supply of compressed fluid to the nozzles. According to a feature of the invention, the valve means controlling the supply of compressed fluid is connected with the change-over means in such manner that the valve means shuts off the supply of fluid pressure to a nozzle whilst plastic material is being extruded from that nozzle and opens to supply compressed fluid to said nozzle when the change-over means is or has been actuated to stop extrusion from that nozzle, the valve means again shutting off the supply of compressed fluid to that nozzle before plastic material is again extruded therefrom by the operation of the change-over means.

The invention also consists in a process for the manufacture of blown hollow articles from organic plastic materials, which consists in heating comminuted solid organic plastic material in a chamber to plasticise it to a semi-fluid mass whilst it is being continuously advanced through said chamber, selectively extruding the semi-fluid material in turn through each of a plurality of annular extrusion nozzles, changing over the feed of plastic material to another nozzle when a desired length of tubing has been extruded through one of the nozzles and thereafter expanding the length of tubing to form the desired hollow article by admitting compressed air into the tube after its open end has been closed and it has been surrounded by a mould cavity defining the shape of the article to be made, and opening the mould and removing the blown article before the machine cycle has been completed and plastic material is again extruded from that nozzle.

In order that the invention may be more clearly understood, an embodiment thereof will now be described with reference to the accompanying drawings in which:

Fig. 1 shows diagrammatically a side view of the machine, partly in section, and with some of the components removed in order to simplify the drawing.

Fig. 2 shows a plan view of the machine looking along the line A—A of Fig. 1.

Fig. 3 shows a plan view of the mechanism for advancing the machine to its different positions.

Fig. 4 shows the form of a cam.

Fig. 5 shows a section through a nozzle, on an enlarged scale, with a mould in position.

Fig. 6 shows a side view of the mould operating mechanism.

The machine illustrated in the drawings comprises four nozzles with an extrusion control valve arranged so that plastic material under pressure may be selectively extruded from the nozzles in turn. The extrusion pressure is created in known manner by a rotating feed screw 1 arranged in a heated chamber 2 to which comminuted plastic material is fed from a hopper 3. The screw is driven by means of a motor 4 through reduction gearing 5 and a clutch 6. The chamber 2 is heated by electric heating elements 7 which may be encased by heat-insulating material 8, the temperature of the chamber 2 being thermostatically controlled in known manner by a thermostat of which only the thermo-responsive element is diagrammatically illustrated at 9.

The plastic material is plasticised in the chamber 2 and advanced therethrough by the feed screw 1 in known manner, the plasticised material being ejected from an outlet orifice 10 leading to an extrusion control valve 12 for selectively feeding the plastic material to each of the extrusion nozzles. The control valve 12 is, in the illustrated embodiment, constructed in the form of a plug cock, the rotatable member 13 of the plug cock being formed with a central cavity 14 extending partway therethrough and connecting with a transverse passage 15 which may be selectively brought into communication with four passages 16 formed in the valve body at right angles to one another (when viewed from above). These four passages 16 are connected respectively with conduits 17 extending outwardly from the valve 12, the outer ends of the conduits 17 being directed downwardly and being provided at their free ends with extrusion nozzles 18. The extrusion nozzles 18 are each provided with an inner tubular member 19 which defines, with the inner surface of the nozzles 18, an annular passage so that the plastic material will be extruded from the nozzle in the form of a tube. Each of the inner tubular members 19 extends through the wall of its surrounding conduit 17 and leads to an air control valve 20 carried by the table 21 of the machine. Four such air control valves 20 are provided, one for each of the inner tubular members 19 of the four nozzles. The conduit 17 is heated by electrical heating elements 22, 23 and may be encased with insulating material 24. The temperature in a conduit is thermostatically controlled, the thermo-responsive elements of the thermostats being indicated at 25 and 26. The temperature in the conduit is controlled so that the plastic material therein will remain plasticised or will be further softened by the applied heat.

The plug cock 13 of the valve 12 is connected at its lower end with a vertical shaft 27 which extends through a central aperture in the table 21 and has its lower end carried in a bearing 28 carried by the base 29 of the machine frame.

The base 29 also carries support brackets 30 of inverted channel form from which the table 21 is supported by four threaded rods 31 disposed respectively adjacent the corners of the table. By adjusting the nuts 32 on the threaded rod 31 the height of the table 21 can be adjusted.

The shaft 27 is rotated in step-by-step fashion by means of a feed mechanism and in such manner that at each feeding step the shaft 27 will be turned through 90° and be stopped in a position in which the transverse passage 15 in the plug cock is in communication with one of the passages 16 in the valve body. Thus each time the shaft 27 is advanced the plug cock 13 is rotated through a quarter of a turn so that the plastic material will be extruded through the four nozzles 18 in turn.

The feed mechanism for turning the shaft 27 comprises a reciprocating member 33, of rectangular cross-section, in one edge of which is cut a recess 34 which accommodates a feed finger 35 pivoted to the member 33 at 36. Within an aperture 37 drilled in the side wall of the recess 34 is located a spring 38 which urges the feed finger out of the recess to the position shown in Fig. 3, a stop (not shown) being provided for preventing further outward movement of the feed finger 35 beyond the position shown.

When the reciprocating member 33 is in its extreme left-hand position as shown in Fig. 3, the feed finger 35 lies adjacent one of four pegs 39 projecting from a disc 40 fixed to the shaft 27. Movement of the reciprocating member 33 towards the right will cause the end of the feed finger 35 to engage with the adjacent peg 39 to rotate the shaft 27. The movement of the member 33 is limited so that the shaft 27 will be rotated through a quarter of a turn at each movement towards the right of the member 33. During its return movement towards the left, the feed finger 35 is moved into the recess 34, against the spring 38, as it moves past the peg 39 which has advanced to the position previously occupied by the peg which was engaged by the feed finger on its preceding stroke towards the right. Return movement of the disc 40 during this return movement of the reciprocating member 33 is prevented by the spring-pressed latch 41 which engages behind one of the pegs 39 as shown in the drawing. When the member 33 is moved to its extreme left-hand position, the feed finger 35 is again moved out by the spring 38 to engage with the adjacent peg 39 during the next advancing movement of the member 33 towards the right.

The reciprocation of the member 33 is effected hydraulically by two plungers 42, 43 arranged in the cylinders 44, 45 and acting respectively move the member 33 in opposite directions when hydraulic pressure is applied alternately to the two cylinders 44, 45. The hydraulic pressure is generated by an oil pump 46 and associated sump, the pressure side of the pump being connected by a pipe 47 to an oil control valve 48 controlling the operating cycle of the machine. This control valve is actuated by a cam 49 driven from the output shaft of the reduction gear 5 through a gear train 50 of which the gear ratio can be adjusted or changed to alter the time cycle of the machine. The oil control valve 48 is movable to two positions in which the oil pressure in the pipe 47 is connected respectively to either the cylinder 44 or cylinder 45 through pipes 51, 52 respectively, that one of the pipes 51, 52 which is not connected to the oil pressure pipe 47 being connected by the valve 48 to the exhaust pipe 53 so that the oil discharged from a cylinder will be exhausted into the sump of the pump 46. The cam 49 is of the shape generally indicated in Fig. 4, and is provided with a step 49' so that the control member of the valve 48 will suddenly move to the position in which oil is fed to the cylinder 44 for advancing the shaft 27 so that the shaft is advanced suddenly. The return movement of the member 33 is effected more gradually as the control member of the valve 48 is gradually moved to its other position when rising up the cam surface.

Carried by the table 21 beneath the nozzles 18 are the four moulds and the associated opening and closing mechanism. The moulds are preferably two-part moulds comprising the two parts 54 carried respectively by plattens 55, 55' which may be moved towards and away from one another to close and open the mould. The moulds are water cooled in known manner (not shown) and are detachable from the plattens so that different moulds may be used. The plattens are actuated by two pairs of hydraulic rams 56, 56', 57, 57', the rams 56 and 57 serving for closing the mould and being of larger diameter than the rams 56', 57' which serve for opening the mould. The outer ends of the rams 56 and 57 are directly connected to their adjacent plattens whilst the outer ends of the rams 56', 57' are connected respectively to cross-members 58, 58' inter-connecting the ends of pairs of guide rods 59, 59' the opposite ends of which are secured to the plattens 55, 55' respectively. The rods 59, 59' are freely movable through apertures in the plattens 55, 55' respectively. The pairs of rods 59, 59' thus serve to guide the alignment of the plattens 55, 55' and when pressure is applied to the rams 56', 57' the plattens will be moved in a direction to open the mould.

The supply of oil pressure for opening and closing the four moulds is controlled by four oil control valves 60, 61, 62, 63, the operation of these valves being controlled by cams 64, 65, 66, 67 respectively all of which are fixed on the shaft 27. The cams are similar to the cam 49 and are so shaped that when the control member of a valve falls off the step in its associated cam the corresponding mould will be closed and will remain closed until the cam has been moved through 180°, that is through two further stepping positions, when the oil control valve will be actuated to open the mould and keep it open for two stepping positions. Each control valve is connected to the oil supply pipe 47, the outlet pipes 68 being connected to the two cylinders of the large diameter rams 56, 57 of the corresponding mould operating assembly and the outlet pipes 69 to the two cylinders of the two small diameter rams 56', 57', only the pipes 68, 69 leading from the valve 60 are shown connected to the mould mechanism; the pipes from the other valves have not been shown in full in order to simplify the drawing. Each of the pipes 68 is connected to its corresponding pair of cylinders through a check valve 70 which maintains the pressure in these cylinders to hold the mould parts firmly closed until the corresponding oil control valve is actuated to open the mould. This avoids any possibility of the moulds opening slightly with variations in the pressure in the oil supply line. Each check valve 70 is so constructed that it is released and allows the oil in the associated large diameter cylinders to exhaust through the pipe 71 to the pipe 53 when pressure is applied through the pipe 69 to open the mould. Oil from the small diameter cylinders is exhausted back to the pipe 53 through the pipe 72 connected to the control valve in the usual way.

The four cams 64–67 are disposed at right angles to one another so that as the shaft 27 is stepped around the moulds associated with the different nozzles will open and close successively and in correct order in accordance with the timed operation of the machine.

The shaft 27 also carries a cam 73, similar in shape to the cam 49, which serves to operate the air control valves 20. The four air control valves 20 corresponding to the four nozzles are disposed around this cam so as to be actuated in turn. The cam is so shaped that it will keep a control valve open at two stepping positions and closed at two stepping positions. The cam 73 is so positioned with respect to the cams 64–67 controlling the opening and closing of the moulds that air will be fed to the inner tubular member 19 of a nozzle only during those periods when the associated mould is closed. The cam timing is preferably such that the air pressure is turned on shortly after the corresponding mould has closed.

Also carried by the shaft 27 is a disc 75 carrying on its upper surface a wedge shaped cam 76 adapted to engage with and raise the inner ends of four ejector levers 77 for removing the moulded bottles from the nozzles. Each of the levers 77 is individual to one of the nozzles and each is pivoted at a bearing 78 carried by a block 79 from the table 21. The block 79 also accommodates a spring-pressed plunger 80 for normally urging the inner end of its associated lever 77 towards the disc 75. The outer end of each lever 77 is formed with a forked or annular portion 81 surrounding the nozzle so that, when the inner end of a lever 77 is raised by the cam 76, its portion 81 will move downwardly to remove the moulded bottle from the nozzle 18. The cam 76 is so positioned with respect to the other cams on the shaft 27 that a lever 77 will be actuated whilst the corresponding mould is opened and preferably at the beginning of the stage when plastic material is extruded through that nozzle. The cam 76 passes beneath and leaves each of the levers during its movement from one position to the next, and does not remain in contact with any of the levers when the shaft 27 is stationary in any of its four positions.

In order to stop rotation of the feed screw 1 if a mould is not being used at any one of the nozzle positions, means are provided for disengaging the clutch 6 when the screw would normally be extruding plastic material through the nozzle which is not in use. This is effected by means of the disc 82 fixed on the shaft 27 and on which removable cam members 83 may be secured in one or more of the four positions corresponding to the different nozzles. The cam 83 is adapted to operate an oil control valve 84 to control the supply of oil pressure to either one or other of two rams 85, 86 connected to mechanism for actuating the clutch 6. The valve 84 normally connects the oil pressure to ram 85 to keep the clutch 6 engaged, but when a cam 83 engages therewith the oil pressure is exhausted from the ram 85 and applied to the ram 86 to disengage the clutch. The cam 83 holds the control valve in this position so long as the shaft 27 is stationary in the position in which the control valve 12 connects the chamber 2 to the nozzle which is not in use. As soon as the shaft 27 leaves this position the oil control valve 84 is actuated to re-engage the clutch.

In operating the machine, the feed screw 1 is rotated at a desired speed for extruding the plastic material, for which purpose the motor 4 is preferably a variable speed motor, and the time cycle of the machine is adjusted by a suitable selection of the gear train 50 so that the desired amount of plastic tubing will be extruded from each nozzle in turn. Assuming that plastic material is being extruded from the first nozzle, after the time interval set for the time cycle, the shaft 27 is rotated through a quarter of a turn to a second position to disconnect the supply of plastic material from the first nozzle and to connect it to the second nozzle. As the shaft 27 approaches this second position, that one of the cams 64–67 corresponding to the first nozzle actuates its associated oil control valve to close the mould around the length of plastic tubing depending from the first nozzle. The open end of the plastic tube is closed automatically by being gripped between the bottom walls of the two mould parts when the mould is closed. When in this second position the cam 73 also actuates the air supply valve 20 corresponding to the first nozzle to admit the air under pressure through the inner tubular member 19 of that nozzle and thereby blow the plastic tubing to conform with the internal configuration of the mould.

Whilst these operations are taking place a length of tubing is being extruded from the second nozzle and, after the predetermined time set by the time cycle, the shaft 27 is again rotated through a quarter of a turn to a third position to shut off the supply of plastic to the second nozzle and to connect it to the third nozzle. The second mould is then closed around the length of tubing depending from the second nozzle, and the second bottle is blown as above described. When the shaft is in this third position the mould associated with the first nozzle remains closed with the air pressure applied. By the end of this third period the first bottle has solidified sufficiently to permit the mould thereof to be opened and the bottle removed.

At the fourth movement of the shaft 27 the supply of plastic is disconnected from the third nozzle and connected to the fourth nozzle, and that one of the cams 64–67 associated with the first nozzle actuates its oil control valve to open the mould associated with the first nozzle, the cam 73 having previously released the air control valve 20 associated with the first nozzle to disconnect the compressed air supply from the first nozzle and to vent the interior of the first bottle.

Due to the configuration of the mould the extruded portion of the tubing is cut, either entirely or substantially entirely, from the mass of plastic material in the extrusion nozzle when the mould is closed. Thus when the mould is opened the formed bottle may be easily pulled away from the nozzle. This is effected mechanically by the lever 77 which is actuated when the shaft is again turned from its fourth to its first position by the inner end of the lever 77 being engaged by the cam 76 during this movement. The formed bottles fall through openings 21' in the table 21 directly beneath the nozzles and may be directed by chutes 87 away from the machine, for example, on to a conveyor belt.

When the shaft 27 again reaches its first position, plastic material is again extruded from the first nozzle and the cycle of operations is repeated.

Whilst a particular embodiment has been described it will be understood that various modifications may be made without departing from the scope of the invention. Thus, for example, instead of a single extrusion control valve, the change-over means for feeding the plastic material to the different nozzles may comprise shut-off valves individual to the different nozzles which are selectively opened, either mechanically, hydraulically, electrically or in any other convenient manner, in accordance with the desired time cycle. Further, the change-over means can, in a simplified machine, be operated manually instead of automatically. The closing and opening of the moulds may also be effected manually.

I claim:

1. A machine for the manufacture of blown hollow articles from organic plastic material, comprising a chamber containing a rotatable feed screw, means for rotating said feed screw at a desired rate of speed, means for feeding comminuted solid organic plastic material to said chamber, said screw advancing the material fed thereto towards an outlet opening, means for heating said chamber so that the material is plasticised to a semi-fluid mass before it reaches said outlet opening, conduits leading from said opening to a plurality of extrusion nozzles having their outlets vertically disposed, each nozzle comprising inner and outer tubular members defining between them an annular passage through which the semi-fluid mass fed thereto extrudes freely downwards in tubular form, heating means associated with said conduits for maintaining any plastic material therein in the semi-fluid state, shut off means for controlling the extrusion of plastic material through each of said nozzles, actuating means for selectively operating said shut-off means for extruding the plastic material from said nozzles in turn, means for feeding a compressed fluid through the inner member of each nozzle, and means for selectively controlling the supply of compressed fluid to the individual nozzles.

2. A machine for the manufacture of blown hollow articles from organic plastic material, comprising a chamber containing a rotatable feed screw, means for feeding comminuted solid organic plastic material to said chamber, said screw advancing the material fed thereto towards an outlet opening, means for heating said chamber so that the material is plasticised to a semi-fluid mass before it reaches said opening, conduits leading from said opening to a plurality of extrusion nozzles, each nozzle comprising inner and outer tubular members defining between them an annular passage through which the semi-fluid mass fed thereto will be extruded in tubular form, heating means associated with said conduits for maintaining any plastic material therein in the semi-fluid state, shut-off means for controlling the extrusion of plastic material through each of said nozzles, actuating means selectively operating said shut-off means for extruding the plastic material from said nozzles in turn, means for feeding a compressed fluid through the inner member of each nozzle, and means for selectively controlling the supply of compressed fluid to the individual nozzles comprising a valve which is automatically operated in timed relation with the actuating means in such a manner that the valve shuts off the supply of fluid pressure to that nozzle from which plastic is being extruded whilst plastic is being extruded therefrom and opens to supply compressed fluid to said nozzle when the actuating means operates to stop extrusion therefrom, the valve means again shutting off the supply of compressed fluid to that nozzle before plastic material is again extruded therefrom by the operation of the actuating means.

3. A machine as claimed in claim 1, wherein the actuating means for selectively operating the shut-off means is operated automatically, in accordance with a desired time cycle, from the feed screw rotative means.

4. A machine as claimed in claim 3, wherein an adjustable coupling is provided between the feed screw rotative means and the actuating means, in order to adjust the time cycle.

5. A process for the manufacture of blown hollow articles from organic plastic materials, which consist in heating a continuous moving stream of comminuted solid organic plastic material moving at a constant rate to plasticise it to a semi-fluid mass, selectively extruding the semi-fluid material in a downward direction under the influence of gravity in turn through each of a plurality of laterally spaced annular extrusion nozzles to form a series of tubes with open lower ends, changing-over the feed of plastic material to another nozzle when a desired length of tubing has been extruded through one of the nozzles, closing the lower open end of the extruded length of tubing and expanding it while the plastic material is being extruded from said other nozzle to form the desired hollow article by admitting compressed fluid into the open upper end of the tubing after it has been surrounded by a mould cavity defining the shape of the article to be made, and opening the mould and removing the blown article before the extruding process cycle has been completed in all said nozzles.

6. A machine for the manufacture of blown hollow articles from organic plastic material, comprising a plurality of extrusion nozzles each comprising inner and outer tubular members defining between them an annular passage, each of said nozzles being arranged to extrude plastic material therefrom in a downward direction to form a tubular extrusion, means for feeding plasticised material to said extrusion nozzles, shut-off means for controlling the extrusion of plastic material through each of said nozzles, actuating means for selectively operating said shut-off means to extrude the plastic material from said nozzles in turn, a plurality of moulding dies, one for each nozzle and each mounted directly below its associated nozzle, means for feeding a compressed fluid to the inner member of each nozzle, and means for selectively controlling the supply of compressed fluid to the individual nozzles, each mould being made of two parts which when closed together define a cavity corresponding in shape with the hollow article to be made, the upper end of the cavity communicating with an inlet opening engaging with the associated nozzle when the mould parts are closed together, and the lower end of said mould being shaped to pinch and close the open end of the tubular extrusion formed by said nozzle when the two parts are closed together.

7. A machine for the manufacture of blown hollow articles from organic plastic material, comprising a chamber containing a rotatable feed screw, means for feeding comminuted solid organic plastic material to said chamber, a driving motor coupled to rotate the feed screw to advance the material fed thereto towards an outlet opening, means for heating said chamber so that the material is plasticised to a semi-fluid mass before it reaches said outlet opening, a rotatable distributing valve connected to said outlet opening and rotatable selectively to connect said outlet opening to one of a plurality of conduits leading from said distributing valve respectively to a plurality of extrusion nozzles, each nozzle comprising inner and outer tubular members defining between them an annular passage through which the semi-fluid mass fed thereto will be extruded in tubular form, actuating means for selectively positioning said distributing valve for extruding plastic material from said nozzles in turn, feed conduits for a compressed fluid connected respectively to the inner member of each nozzle, a fluid control valve connected in each of said feed conduits, means operated in dependence upon the position of the distributing valve to actuate said fluid control valves in such manner that a fluid control valve shuts off the supply of fluid pressure to its associated nozzle while plastic material is being extruded from its associated nozzle and opens to supply compressed fluid to its associated nozzle for at least part of the time during which plastic material is not being extruded from its associated nozzle.

8. Machine as claimed in claim 7 comprising also a plurality of split moulding dies associated respectively with the nozzles and each mounted in a fixed location relative to its associated nozzle, means for opening and closing each moulding die, and means operated in dependence upon the position of the distributing valve for controlling the opening and closing of said dies.

9. Machine as claimed in claim 8 wherein each moulding die is associated with a first hydraulic ram for moving the die-parts to the closed position and a second hydraulic ram for moving the die-parts to their open position, valve means actuated by means rotatable with the distributing valve to control the supply of hydraulic pressure alternatively to said first and second rams and simultaneously alternatively to release the hydraulic pressure from said second and first rams respectively, a non-return valve in the supply lead to said first ram, and means responsive to the application of hydraulic pressure to the second ram to render said non-return valve inoperative and permit the hydraulic pressure applied to said first ram to be released.

10. Machine as claimed in claim 9, comprising also means associated with each nozzle for removing therefrom a hollow article which has been produced at that nozzle, and means operated in timed relation with the rotation of the distributing valve for operating said removing means when the moulding dies are open.

11. Machine as claimed in claim 7 comprising a clutch coupling between the driving motor and the feed screw, and means for disengaging the clutch coupling when the distributing valve is set to feed plastic material to a selected nozzle.

12. Machine as claimed in claim 7, wherein the actuating means is operated by a double-acting hydraulic motor the back-and-forth movement of which is controlled by valve means actuated by a member driven from the driving motor for the feed screw.

13. A machine for the manufacture of blown hollow articles from organic plastic material, comprising a chamber containing a rotatable feed screw, means for feeding comminuted solid organic plastic material to said chamber, said screw advancing the material fed thereto towards an outlet opening, means for heating said chamber so that the material is plasticised to a semi-fluid mass before it reaches said outlet opening, conduits leading from said outlet opening to a plurality of extrusion nozzles, each nozzle comprising inner and outer tubular members defining between them an annular passage through which the semi-fluid mass fed thereto will be extruded in tubular form, shut-off means for controlling the extrusion of plastic material through each of said nozzles, actuating means for selectively operating said shut-off means for extruding plastic material from said nozzles in turn, feed conduits for a compressed fluid connected respectively to the inner member of each nozzle, means for selectively controlling the supply of compressed fluid through said feed conduits, and settable means for stopping rotation of the feed screw when the shut-off means are set to feed plastic material to a selected nozzle.

14. Machine as claimed in claim 13, wherein the feed screw is driven from a driving motor through a clutch coupling, and wherein the settable means comprises a member which is interchangeably mountable at different positions on an element which moves with the operation of the shut-off means, said member being operative to disengage the clutch coupling when the shut-off means are set to feed plastic material to the selected nozzle.

15. Machine as claimed in claim 14 comprising also a plurality of split moulding dies associated respectively with the nozzles and each mounted in a fixed location relative to its associated nozzle, means for opening and closing each moulding die, and means controlling the opening and closing of said dies in sequence in timed relation with the operation of the actuating means.

16. A machine for the manufacture of blown hollow articles from organic plastic material comprising a plurality of extrusion nozzles each comprising inner and outer tubular members defining between them an annular passage, means for feeding plasticised material to said extrusion nozzles, a plurality of split moulding dies, one for each nozzle and each mounted in a fixed location relative to its associated nozzle, shut-off means for controlling the extrusion of plastic material through each of said nozzles, actuating means for selectively operating said shut-off means for extruding the plastic material from said nozzles in turn, means for feeding a compressed fluid through the inner member of each nozzle, means for selectively controlling the supply of compressed fluid to the individual nozzles, means for opening and closing each moulding die, and means controlling the opening and closing means for the different dies in sequence in timed relation with the operation of said shut-off means.

17. Machine as claimed in claim 16, wherein each moulding die is associated with a first hydraulic ram for moving the die-parts to the closed position and a second hydraulic ram for moving the die-parts to their open position, valve means actuated by means operated by the shut-off means to control the supply of hydraulic pressure alternatively to said first and second rams and simultaneously alternatively to release the hydraulic pressure from said second and first rams respectively, a non-return valve in the supply lead to said first ram, and means responsive to the application of hydraulic pressure to the second ram to render said non-return valve inoperative and permit the hydraulic pressure applied to said first ram to be released.

18. A machine for the manufacture of blown hollow articles from organic plastic material, comprising a chamber containing a rotatable feed screw, means for feeding comminuted solid organic plastic material to said chamber, a driving motor coupled to rotate the feed screw to advance the material fed thereto towards an outlet opening, thermostatically controlled means for heating said chamber so that the material is plasticised to a semi-fluid mass before it reaches said outlet opening, a rotatable distributing valve connected to said outlet opening and rotatable selectively to connect said outlet opening to one of a plurality of conduits leading from said distributing valve respectively to a plurality of extrusion nozzles, each nozzle comprising inner and outer tubular members defining between them an annular passage through which the semi-fluid mass fed thereto will be extruded in tubular form, thermostatically controlled heating means associated with said conduits for maintaining any plastic material therein in the semi-fluid state, actuating means for selectively positioning said distributing valve for extruding plastic material from said nozzles in turn, means for altering the coupling ratio between the driving motor and the actuating means, feed conduits for compressed air connected respectively to the inner member of each nozzle, an air control valve connected in each of said feed conduits, and cam means rotatable with the distributing valve and operative to actuate said air control valves in such manner that an air control valve shuts off the supply of compressed air to its associated nozzle while plastic material is being extruded from its associated nozzle and opens to supply compressed air to its associated nozzle for at least part of the time during which plastic material is not being extruded from its associated nozzle.

19. A machine as claimed in claim 18, comprising also a plurality of split moulding dies associated respectively with the nozzles and each mounted in a fixed location relative to its associated nozzle, means for opening and closing each moulding die, and cam means rotatable with the distributing valve for controlling the opening and closing of said dies.

20. A machine for the manufacture of blown hollow articles from organic plastic material, comprising a chamber containing a rotatable feed screw, means for feeding comminuted solid organic plastic material to said chamber, a driving motor, a clutch coupling between said motor and said feed screw whereby when the clutch coupling is engaged the feed screw is rotated to advance the material fed thereto towards an outlet opening, means for heating said chamber so that the material is plasticised to a semi-fluid mass before it reaches said outlet opening, a distributing valve connected to said outlet opening and turnable selectively to connect said outlet opening to each of a plurality of conduits, each conduit leading to a different one of a plurality of downwardly directed extrusion nozzles, each nozzle comprising inner and outer tubular members defining between them an annular passage through which the semi-fluid mass fed thereto will be extruded downwardly in tubular form, means for turning said distributing valve for selectively connecting said outlet opening to one of said conduits, means for feeding a compressed fluid to the inner member of each nozzle, means for selectively controlling the supply of compressed fluid to the inner members of the nozzles, and means for selectively engaging and disengaging said clutch coupling.

References Cited in the file of this patent

UNITED STATES PATENTS

| | | |
|---|---|---|
| 2,175,054 | Ferngren et al. | Oct. 3, 1939 |
| 2,260,750 | Kopitke | Oct. 28, 1941 |
| 2,467,107 | Bailey | Apr. 12, 1949 |
| 2,488,786 | Watkins | Nov. 22, 1949 |
| 2,512,811 | Schuck | June 27, 1950 |
| 2,632,202 | Haines | Mar. 24, 1953 |